(12) United States Patent
Taba et al.

(10) Patent No.: US 7,665,700 B2
(45) Date of Patent: Feb. 23, 2010

(54) WALL MOUNTING BRACKET WITH SLIDABLE WING

(75) Inventors: Serge Taba, San Clemente, CA (US); Ray Call, Mission Viejo, CA (US)

(73) Assignee: Dana Innovations, San Clemente, CA (US)

( * ) Notice: Subject to any disclaimer, the term of this patent is extended or adjusted under 35 U.S.C. 154(b) by 125 days.

(21) Appl. No.: 11/532,009

(22) Filed: Sep. 14, 2006

(65) Prior Publication Data

US 2008/0067309 A1   Mar. 20, 2008

(51) Int. Cl.
*A47F 5/08* (2006.01)
(52) U.S. Cl. .................. 248/231.9; 248/343
(58) Field of Classification Search ............. 248/231.9, 248/27.1, 27.3, 342–344; 381/386, 124, 381/387; 181/148, 150; 52/28, 716.1
See application file for complete search history.

(56) References Cited

U.S. PATENT DOCUMENTS

| | | | | |
|---|---|---|---|---|
| 1,782,791 A * | 11/1930 | Nielsen | ................ | 248/343 |
| 2,802,933 A * | 8/1957 | Broadwin | ................ | 362/366 |
| 3,327,984 A * | 6/1967 | Rennie | ................ | 248/343 |
| 3,664,615 A * | 5/1972 | Kruger | ................ | 248/27.1 |
| 4,250,540 A * | 2/1981 | Kristofek | ................ | 362/368 |
| 4,293,895 A * | 10/1981 | Kristofek | ................ | 362/147 |
| 4,673,149 A * | 6/1987 | Grote et al. | ................ | 248/343 |
| 4,778,134 A * | 10/1988 | Struthers et al. | ................ | 248/27.1 |
| 5,221,069 A * | 6/1993 | Struthers et al. | ................ | 248/231.9 |
| 5,310,149 A * | 5/1994 | Struthers et al. | ................ | 248/231.9 |
| 5,623,789 A * | 4/1997 | Kidwell et al. | ................ | 52/28 |
| 6,415,886 B1 | 7/2002 | Combest | | |
| 6,758,451 B2 | 7/2004 | Rivera et al. | | |
| 7,100,879 B2 | 9/2006 | Pudue et al. | | |
| 7,374,308 B2 * | 5/2008 | Sevack et al. | ................ | 362/147 |
| 2007/0025580 A1 * | 2/2007 | Reardon et al. | ................ | 381/387 |

* cited by examiner

*Primary Examiner*—Korie Chan
(74) *Attorney, Agent, or Firm*—Hani Z. Sayed; Rutan & Tucker, LLP (57) ABSTRACT

A wall mounting bracket installed includes a body and a slidable wing that slides along the body and mates with the discrete attachment positions along the body. In preferred embodiments the body can have a substantially rectangular perimeter and a substantially rectangular opening or a substantially ovoid perimeter and a substantially ovoid opening. It is also contemplated that the body can a perimeter that is of a different shape than the opening or multiple of openings within one perimeter. The opening area preferably have an area of at least 20 $in^2$ and the body has a perimeter-opening distance of less than 1 inch and at least one entry position with markings. Furthermore, the mating portion-opening distance of bracket is less than 0.9 in. Preferred embodiment includes a commercial product comprising the bracket with a body, the slidable wing in which the wing can be pre-attached to the body or not.

19 Claims, 8 Drawing Sheets

WALL MOUNTING BRACKET WITH SLIDABLE WING

FIELD OF THE INVENTION

The field of the invention is wall mounting brackets.

BACKGROUND

Consumers are tending to demand ever more sophisticated home entertainment systems as a result of advances in audio and video technology. Armed with bigger screens and better speakers, many people are turning ordinary rooms into home theater rooms. This requires not only having higher quality technology, but in some cases matching room decorations. Among other things, this means that some consumers prefer to have speakers installed in the wall or the ceiling to match the decor of the room, instead of simply locating speakers in a corner or along the outside of a wall. In such cases installation of the speakers can become paramount to the concept of the whole room.

Traditional speaker installation methods requires cutting a hole in a wall using bracket as a template. The wings are attached to the bracket sometimes via screws or other hard inflexible methods. The wing-bracket is installed into the wall by anchoring the system in the wall. Once that is completed, the wall may need to be spackled and the speaker is installed.

This traditional bracket-wing system has several limitations. One limitation is that such devices are extremely inflexible to accommodate different wall panels. Sometimes the wall is configured such that one wing needs to be longer than the other. Once the wing is attached, there is no flexibility in changing the position of the wing on the bracket. Depending on the relationship between the wall and the speaker's size and shape, different bracket-wing configurations are often required. When the wing-bracket comes pre-attached or affixed in inflexible positions, it becomes cumbersome and difficult to accommodate different walls and speakers.

A second limitation is that the wide width of the traditional bracket and wing system reduces what may be already a very limited space for locating a stud within the wall. Finally, the traditional method does not allow for easy assembly. Most such systems require at least the use of screws and some of the wings and brackets are of one immovable piece. Motivated consumers who want to do it themselves may find it difficult with the traditional system, especially when it comes to different desired speaker units and wall configurations.

Thus, there is still a need for bracket and wing systems and methods that facilitate installation, and provide flexibility to accommodate different wall or ceiling panels.

SUMMARY OF THE INVENTION

The present invention provides apparatus, systems and methods for a mounting bracket that has a body and a slidable wing that can attach at various attachment points on the body of the bracket.

In preferred embodiments the body has a discrete second position on the common side of the body with the first attachment position, at which the wing can be alternatively positioned with respect to the body.

The body of the bracket is contemplated to have at least three sides or at least a curved edge. Furthermore, the body can have a substantially rectangular perimeter and a substantially rectangular opening or a substantially ovoid perimeter and a substantially ovoid opening. It is also contemplated that the body can be a perimeter that is of a different shape than the opening or multiple of openings within one perimeter. The body can be made of plastic, metal, nonmetal, and mixtures thereof. The opening area will preferably have an area of at least 20 in$^2$.

In yet further aspects of preferred embodiments, the body has a perimeter-opening distance of less than 1 inch and at least one entry position with markings. The wing can slide onto the body via the entry position and attaches to any attachment position.

It is contemplated that there is at least one locking position along an edge of the body, and at least one locking clip on a mating portion of the wing that mates with the body at the locking position. The lip slides onto a receiving slot opened at the body and the locking clip serves to interlock with a mating element at the locking position. The mating portion-opening distance of the bracket is less than 9/10 in. Preferred embodiment includes a commercial product comprising the bracket with a body, the slidable wing in which the wing can be pre-attached to the body or not.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
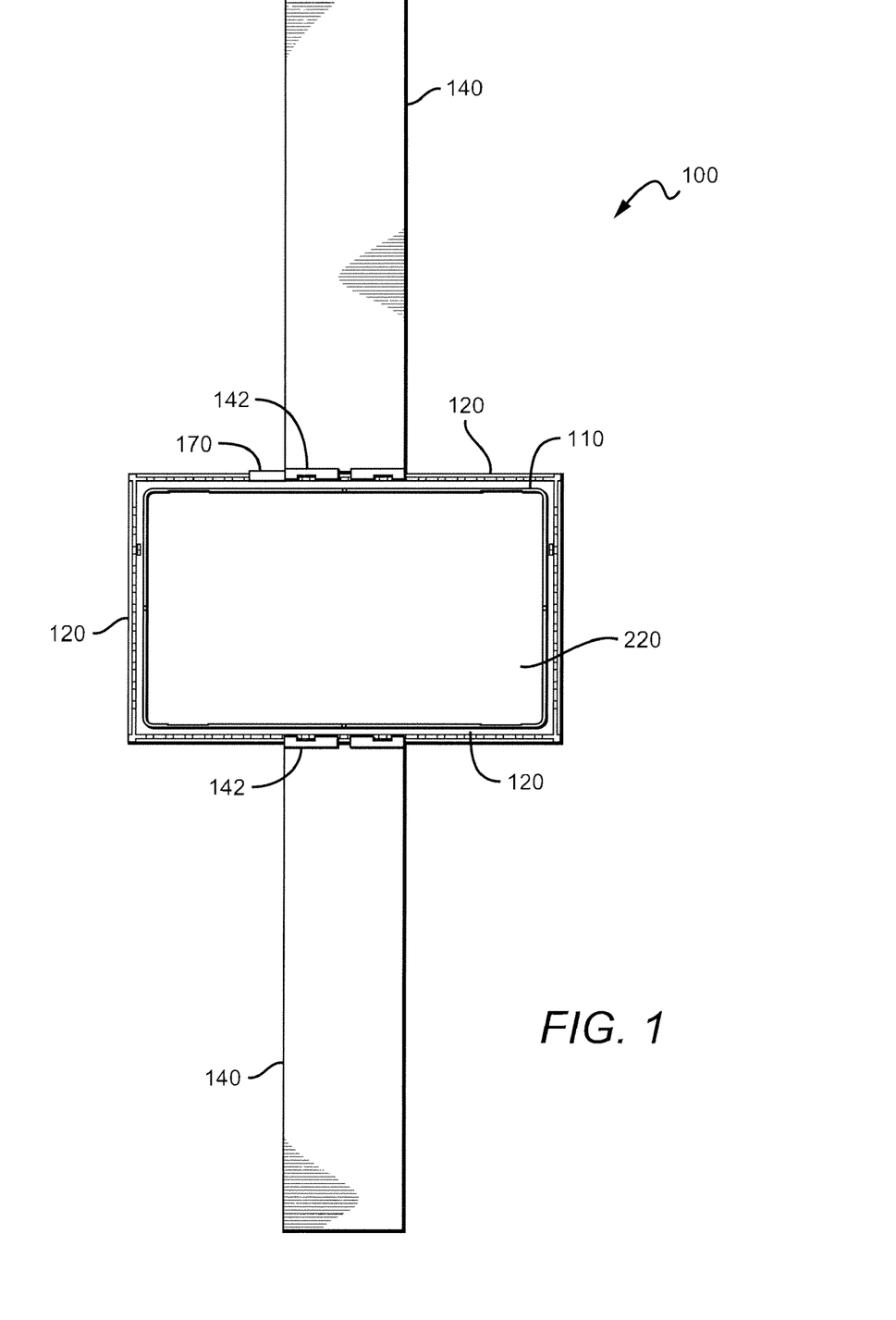
FIG. 1 is front plan view of a bracket with attached wings according to the inventive subject matter.

In FIG. 1 a speaker mounting kit 100 generally includes a bracket 110 disposed in an opening 220, with a plurality of attachment positions 120, and a wing 140 with a mating portion 142 attached at the attachment positions 120 and a holding clip 170.

Figure 2:
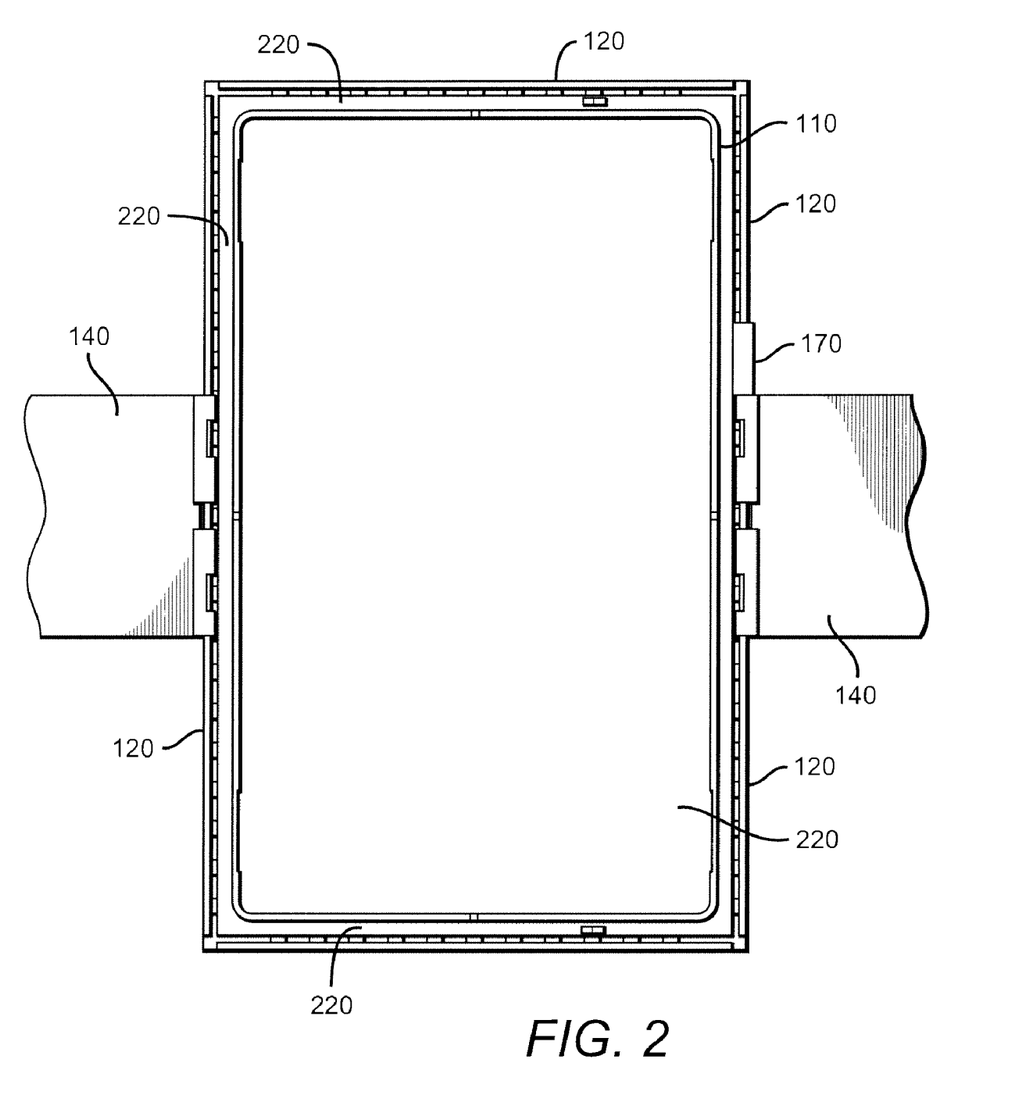
FIG. 2 is a close-up view of FIG. 1.

Bracket 110 has a plurality of attachment positions 120 fitted all along the edges 220 of the bracket 110 to receive a wing 140 as shown in FIG. 2. Preferably, bracket 110 has a rectangular perimeter and four sides and each side has two opposing edges to accommodate the attachment positions, which allows for a tighter locking mechanism. Preferably, there is 0.3 inch width between the edges and they can be as long as it needs to be to accommodate any sized bracket. Depending on how many wings are needed, the bracket can accommodate at least one and even multiple attachment positions along a side of the bracket.

At present, the preferred shape of the bracket is a rectangular shape, 16 inches by 10 inches, but can have any other suitable dimensions, to accommodate any shapes and sized openings. For example, FIGS. 6, 7, 8 and 9 demonstrate a bracket having a circular shape and a triangle shape is also contemplated. Bracket 110 is preferably molded from high strength thermoset plastic, and as shown in greater detail in FIG. 3 bracket 110 also includes speaker cabinet mounts (not shown) for attaching a speaker housing unit (not shown) via a pivot loop 202. It also can include holes for screws (not shown), a recess into which a speaker grill (not shown) can be removed and secured with a rim and optional magnets (not shown).

Attachment positions 120 are sets of indentions located along an outer edge 122 of the bracket 110. The inner edge 124 of the bracket defines the opening 220 and it can be raised or different shape than the perimeter of the bracket. Preferably the distance between the outer edge and the inner edge is less than 0.5 inch, and more preferably less than 0.4 inch. The narrow distance between the bracket and the wing allows for the advantage of more flexibility in locating a wall stud during installation. Locating a stud can be limited when the distance between the bracket and the wing remains too wide.

The outer edge 122 has two side and the attachment positions are located on both sides. Preferably, an attachment position comprises two sets of indentations located along two opposing sides of the outer edge for a secured attachment of the bracket to the wing. However, the attachment positions can vary to any suitable positions and dimensions, even for example, positioned only one side of the sides or overlaps to accommodate attachment of a wing. Preferably, the first set of indentation of the attachment position are 0.75 inch long each and sits 0.1 inch from one edge of the bracket and spaced 2 inches apart from each other. The second set of indentation is a continuation portion about 2.5 inches long and sits 0.05 inch from the opposing edge, and along the center of the portion, there is a further indentation about 0.5 inch long and sits 0.10 inch from the second edge for a tighter attachment. The indentations allow an installer to easily attach a wing to the bracket without any use of screws or nails for considerably greater flexibility.

Attachment positions 120 are preferably located throughout the bracket to receive a wing. Preferably, each side of the bracket will have at least one attachment position and multiple ones depending on the need for secure attachment. The secure attachment is important since in at least some embodiments, the speaker housing will be attached to the bracket 140 rather than being attached directly to a panel supporting the bracket.

The opening 220 can also be any suitable shape and size and can be a substantially different shape than the perimeter of the bracket. Preferred openings are rectangular to accommodate rectangular shaped speaker housings, but could also be ovoid which includes circles as shown in FIGS. 6, 7, 8 and 9 and ovals or any other desired shape. The area of the opening is generally dependent on the size of the speaker. Especially preferred openings have an area of at least 20 in$^2$, 40 in$^2$, 60 in$^2$, and even 100 in$^2$. Nevertheless, for stability, it is contemplated that the bracket have an opening with a length that is no more than 15 inches or less than 5 inches to ensure stability. In some cases it may be desirable to include multiple openings within a bracket to accommodate multiple speakers. Openings could be cut at a job site or elsewhere by an installer, but are more conveniently precut (or molded to include the opening) at the manufacturer.

Figure 4:
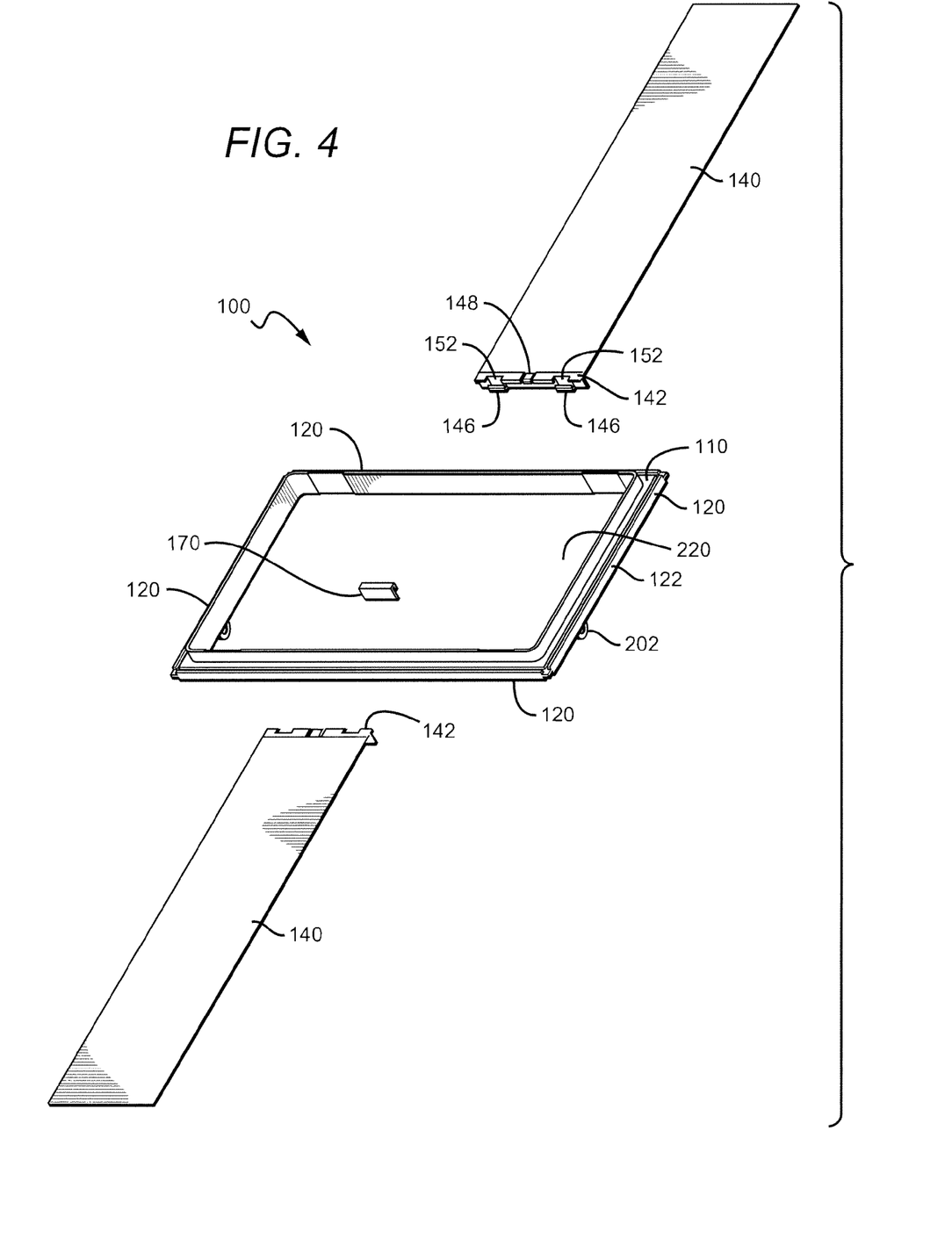
FIG. 4 is a perspective view of the bracket with the wings unattached according to the inventive subject matter.

In FIG. 4, the wing 140 is connected to a mating portion 142 with two locking clips 146 and a lip 148.

Mating portion 142 is a piece of plastic that is welded onto the wing. Other high strength thermoset plastic and materials can be used. The lateral length of the mating portion preferably is less than 0.5 inch, more preferably is less than 0.4 inch.

The short length advantageously allows the wing to be attached to the bracket without adding unnecessary space.

In a preferred embodiment, the configuration of the mating portion 142 is shown in FIG. 4. From the side perspective, the mating portion has a cross-section of the letter "T." There is a base that has one side attached to the wing via a welding method. Different methods of securing the mating portion to the wing are also contemplated, such as using glue or a snap-on mechanism. The base 150 comprises a number of indentations 152, and preferably contains at least one indentation, most preferably two indentations. It is contemplated that there can be multiple indentations along the base of the mating portion.

Lip 148 is disposed in between the indentations 152. When mating with the attachment position, the lip 148 slides into the bracket to ensure locking. The other side of the mating portion has two locking clips 146 which are positioned across from the indentations on the base of the mating portion. However, it is contemplated that there can be one single or multiple locking clips that sit along side of the mating portion. The lip serves to further secured the locking mechanism between the bracket and the wing.

Wings 140 extend from the corresponding edges of the bracket to a panel or a wallboard to support a speaker. Preferably, wings extend coplanar or in the same direction as a plane of the bracket. However, to accommodate different positions, such as when the speaker is positioned at a corner of a wall, the wings can extend normal to a plane of the bracket. At present, at least one wing is attachable by an installer to the bracket at any of the attachment positions on a given side. However, it is possible multiple wings attach to the bracket at various attachment positions.

At present, the wings can extend in any length from any sides of the bracket to allow an installer flexibility. It is contemplated, the length of the wings extends perhaps 12, 16, 24 or even 30 inches or more. Such long wings can accommodate odd installations where the studs are spread apart at a greater distance from each other than normal. The width of the wings should be as long as it needs to be to accommodate the attachment positions. Preferably, the width of the wing is at least as great as a width of the bracket and can accommodate one set of indentation of the attachment position for an easy installation by an installer. Conceivably, the width of the wings can be small or large to accommodate different speaker sizes and thus multiple sets of indentation might be needed.

Figures 3, 5:
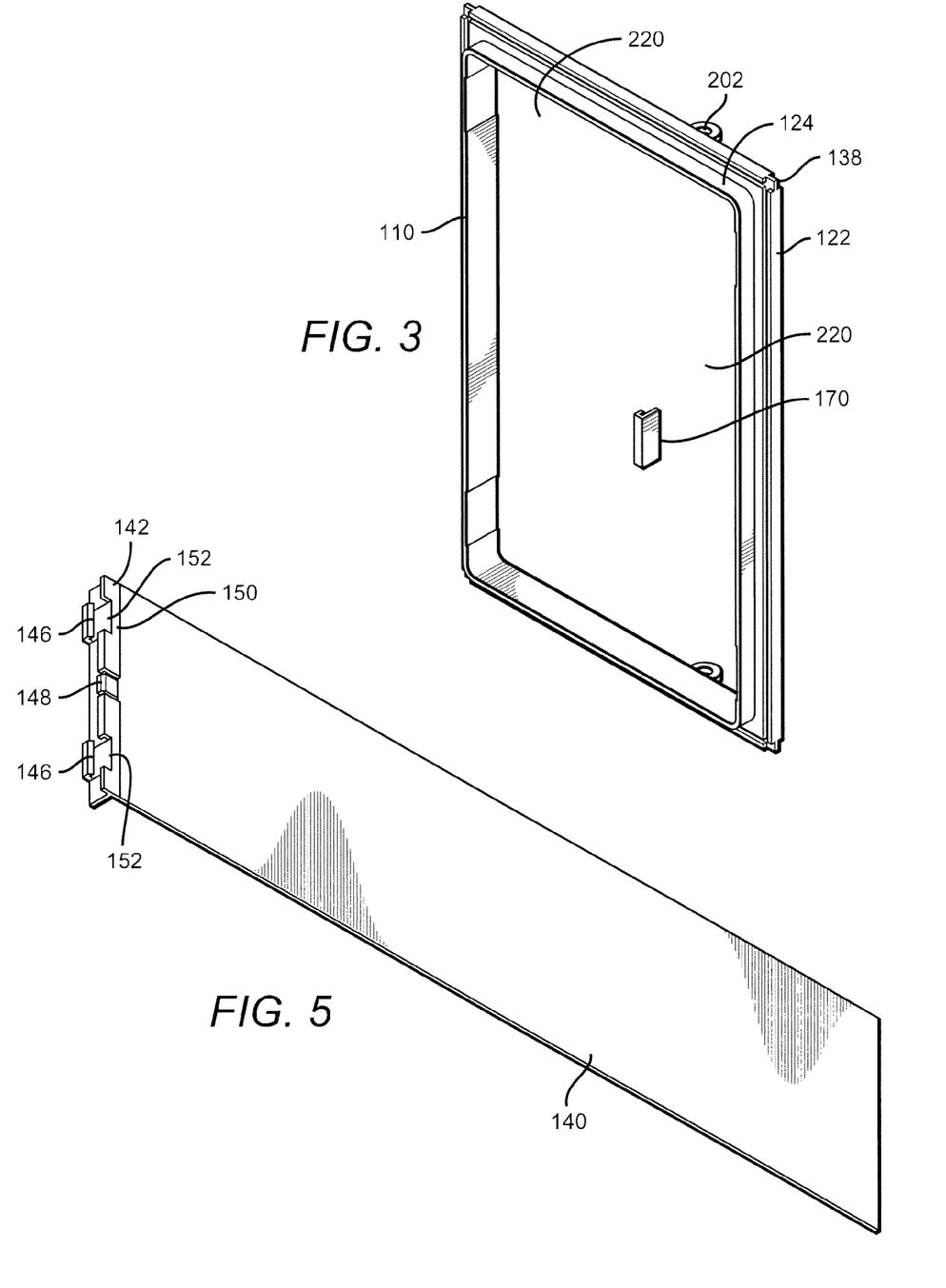
FIG. 3 is a perspective view of the bracket according to the inventive subject matter.
FIG. 5 is a perspective view of a wing according to the inventive subject matter.

Wings 140 are preferably made of a metal mesh, but can include of any suitable material or materials so long as the material(s) provide(s) sufficient shear strength to support the bracket 110 and the speaker 260 in FIG. 5. Metal mesh is also desirable because the wings are advantageously relatively thin, so as not to push out the overlying wallboard, and metals can provide considerable strength and preferably with thickness of less than 100 thousands of an inch. It is contemplated other thickness of wings can be used.

Locking mechanism 160 comprises the locking of the mating portion 142 on the wing 140 to the attachment positions 120 of the bracket 110. This can be more specifically shown in FIGS. 2, 3, 4, and 5 which demonstrate two embodiments of the locking mechanism.

As seen in FIG. 3, the mating portion 142 of the wing mates with the attachment positions 120 of the bracket. Preferably, locking clips 146 slides from an optional entry position point 138 onto the bracket. Depending on the desired position of the wing relative to the bracket, the locking clips slides into the outer edge 122 of the bracket 110 and finds the corresponding desired attachment positions 120 of the bracket. Once in the right position, the locking clips acts as a male portion and mates with the attachment positions that acts like the female portion.

Conceivably, there can be an entry position point at each corner or a rectangular or a square bracket. It is also contemplated that no entry position point is needed in order for the wing to slide into the bracket. The wing can hook onto the inner edge of the bracket from any position to ensure locking. As for an ovoid or circular bracket, there can be one entry position on the bracket to accommodate the wing.

As an added feature to the locking mechanism, holding clip 170 can slide next to the wing on the bracket to ensure the wing does not move from the attachment positions as shown in FIGS. 1, 2, 6 and 8. This ensures the wing is secured on the bracket and does not slide out of the attachment positions. Holding clip 170 has a mating portion that mates the with grooves on the bracket.

In an alternative embodiment shown in FIGS. 6, 7, 8, and 9 the bracket 310 is of a circular shape. Like its rectangular counterpart, the speaker mounting kit 300 comprises round bracket 310, opening 305 with attachment positions 320 that goes around the bracket, wings 340 with a mating portion 350, and a holding clip 370.

Figure 6:
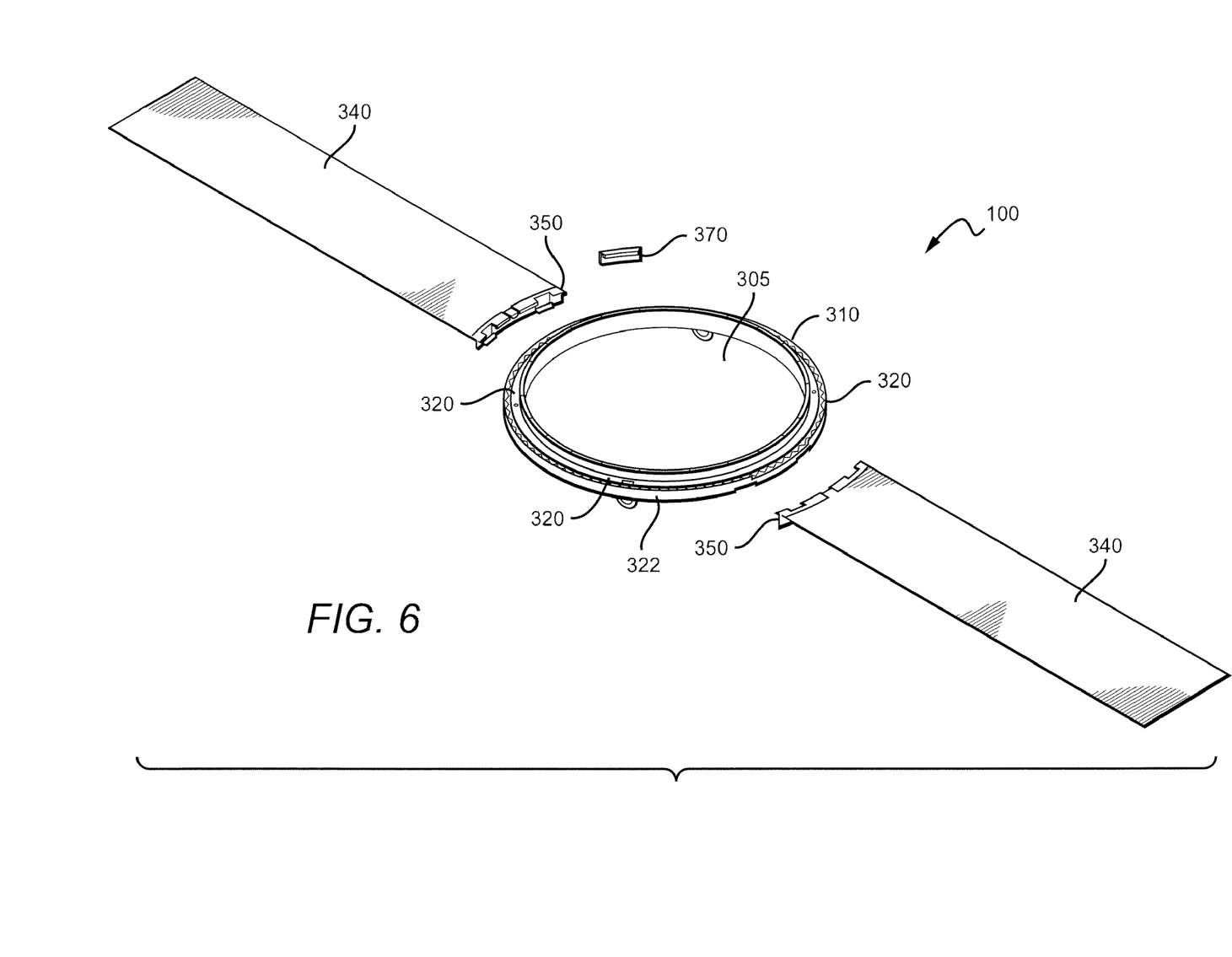
FIG. 6 is an alternative embodiment of a bracket with unattached wings according to the inventive subject matter.

Bracket 310 has a plurality of attachment positions 320 fitted all along the edge 322 of the bracket 310 to receive a wing 340 as shown in FIG. 6, but in any event is preferably sized and dimensioned to fit snugly into the opening 305. Preferably, bracket 310 has a round perimeter and a curved edge to accommodate the attachment positions, which allows for a tighter locking mechanism. Preferably, there is 0.3 inch width between the edges and they can be as long as it needs to be to accommodate any sized bracket. Depending on how many wings are needed, the bracket can accommodate at least one and even multiple attachment positions along the edge of the bracket.

Attachment positions 320 are preferably located throughout the bracket to receive a wing. Preferably, each side of the bracket will have at least one attachment position and multiple ones depending on the need for secure attachment.

The area of the opening is generally dependent on the size of the speaker. Especially preferred round openings have a diameter of at least 6 inches, preferably 8 inches, more preferably 10 inches and larger. Again, it may be desirable to include multiple openings within a bracket to accommodate multiple speakers.

Figure 7:
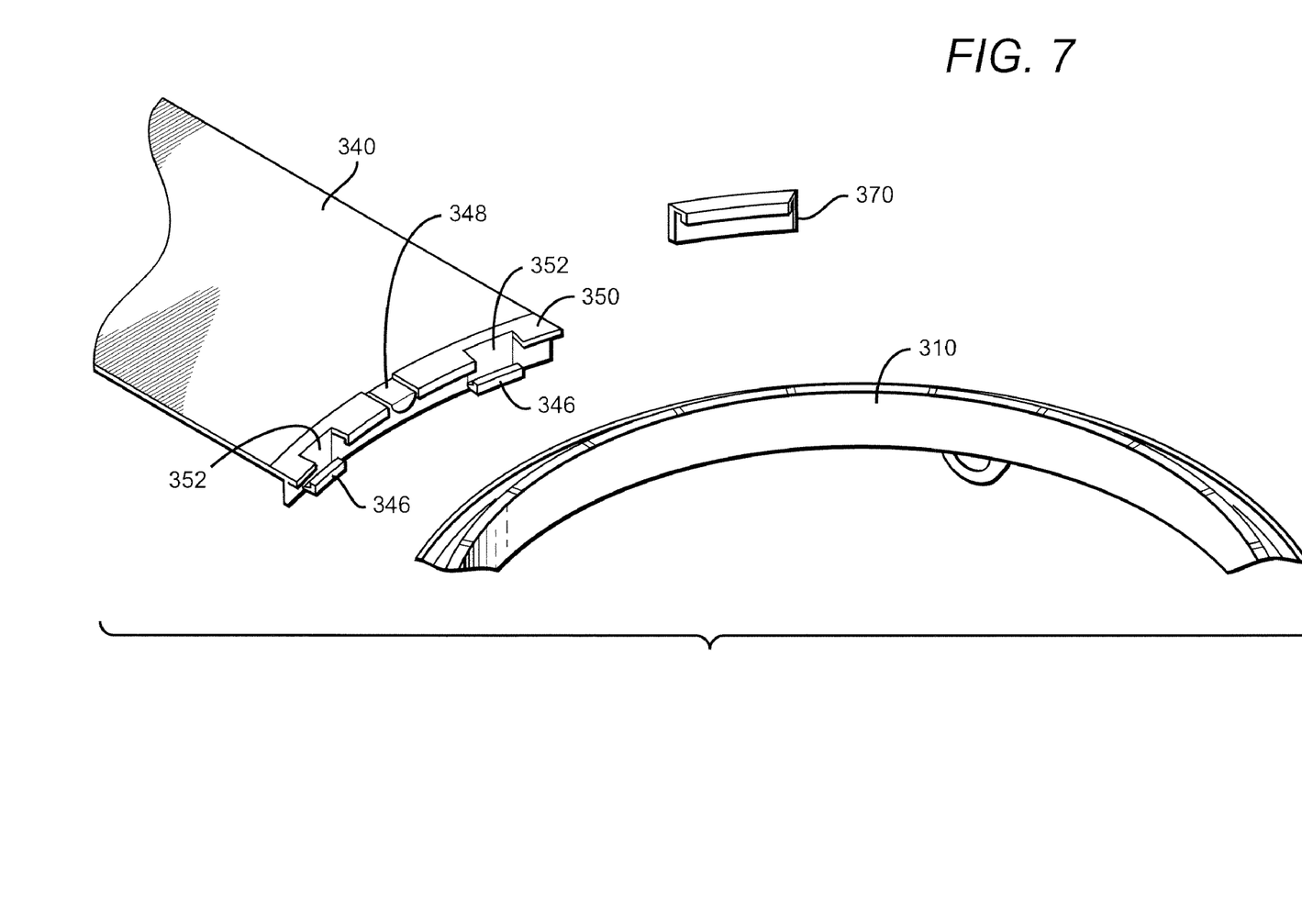
FIG. 7 is a close-up view of FIG. 6.

In FIG. 7, the wing 340 is connected to a mating portion 350 with two locking clips 346 across from two indentations 352, and a lip 348. Since the bracket is round, the mating portion curves to accommodate the round bracket 310.

Figure 8:
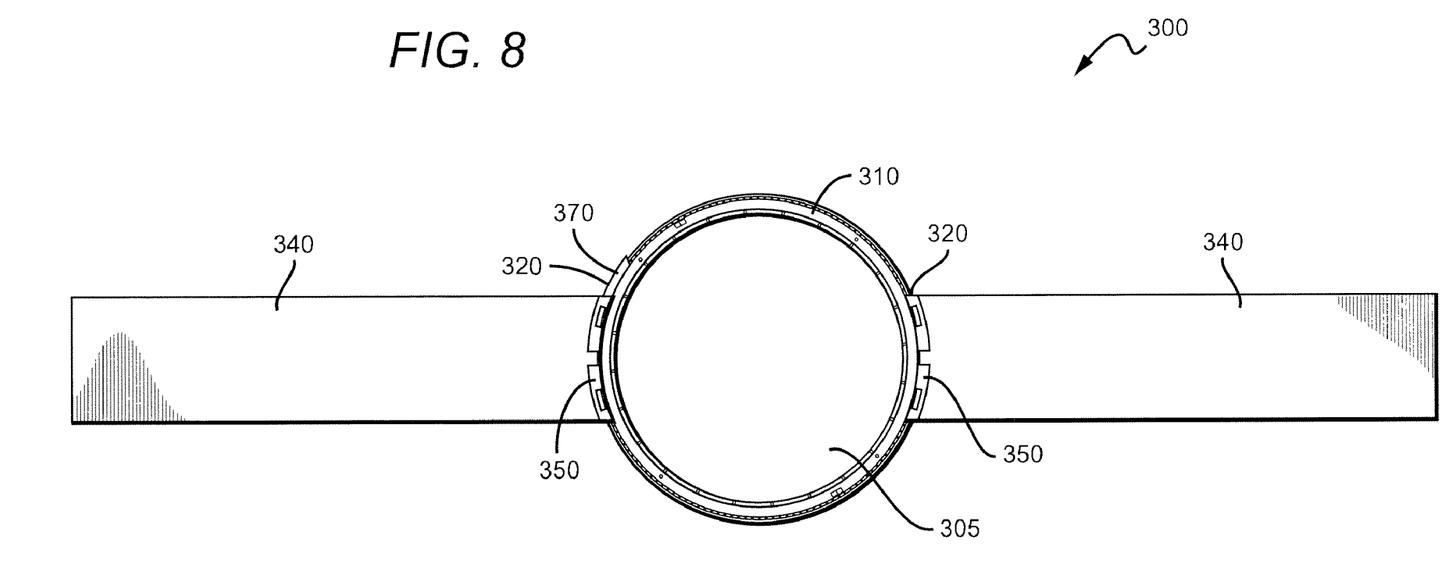
FIG. 8 is a front view of an alternative embodiment of a bracket with attached wings according to the inventive subject matter.
Figure 9:
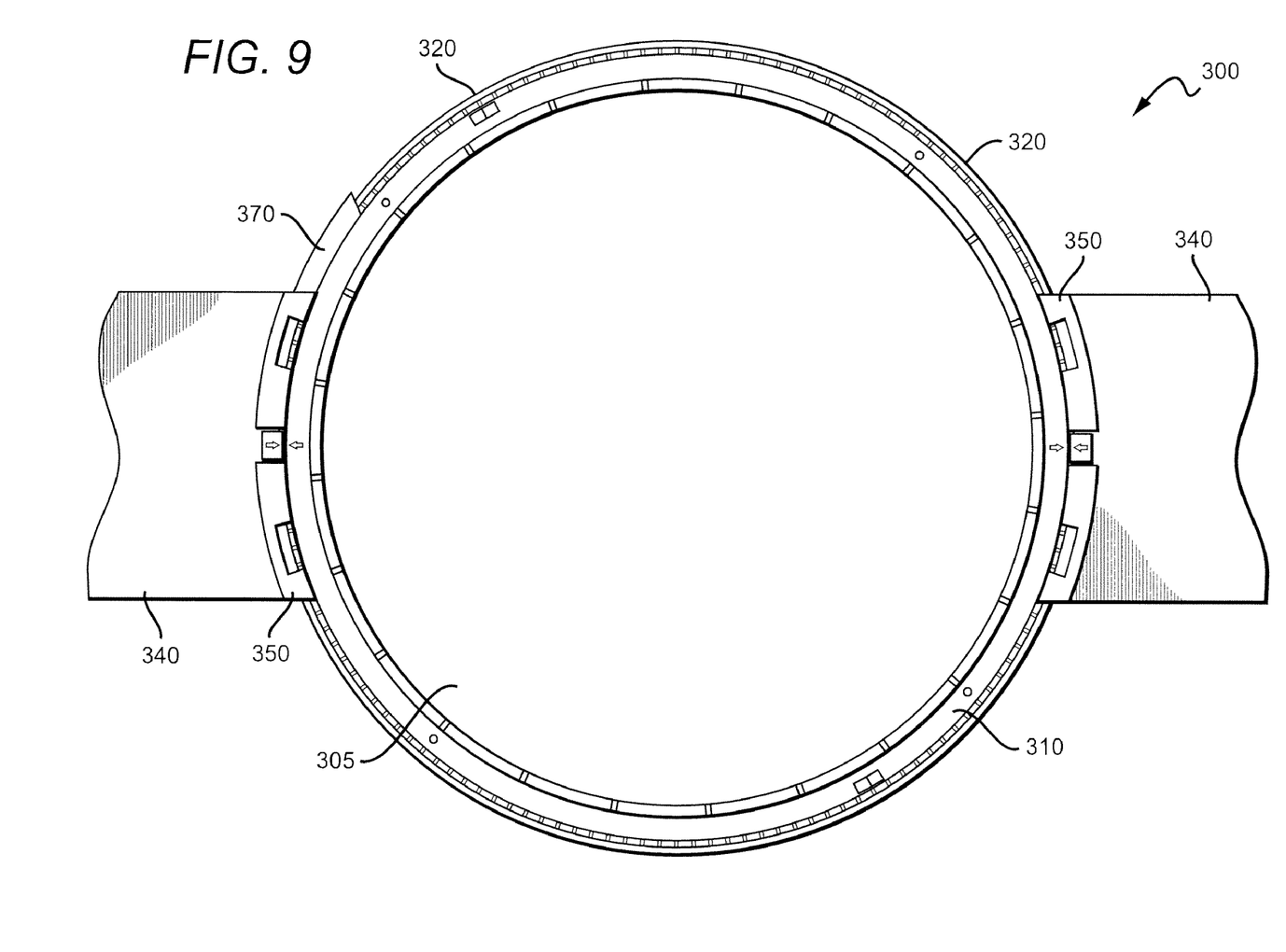
FIG. 9 is a close-up view of FIG. 8.

In preferred embodiments, the locking mechanism of the bracket and wing can be seen in FIGS. 8 and 9. Locking mechanism comprises the locking of the mating portion 350 on the wings 340 to the attachment positions 320 of the bracket 310. In the round bracket embodiment, preferably there is one entry position point for the wing to slide into the bracket. Conceivably, no entry position point is needed for the wing to slide onto the outer edge of the bracket.

As an added feature to the locking mechanism, holding clip 370 is curved and can slide next to the wing 340 on the bracket to ensure the wing does not move from the attachment positions as shown in FIGS. 8 and 9. Again, this ensures the wing is secured on the bracket and does not slide out of the attachment positions.

In yet another alternative embodiment, the locking mechanism of the present bracket system can be of other possible mechanism, such as a snap-on system. The snap-on system allows for the wing to have a mating portion that directly locks onto the bracket with having any entry positions.

In preferred embodiments, the bracket and the wing accommodates the installation of a speaker. Speaker should be interpreted as generically representing all practical speakers, including especially dynamic loudspeakers, but also including speakers without moving coils (e.g. piezoelectric speakers, plasma arc loudspeakers, digital speakers, and electrostatic loudspeakers (ESL)). The speaker grill can be any suitable speaker grill, but is preferably a metallic mesh grill that press-fits into the opening. Additionally or alternatively, the bracket can include a ferrous material that is attracted to magnets (not shown).

Preferably, the bracket-wing system is installed in a wall panel and that the wings would extend evenly on both sides into the wall panel. However, sometimes the studs within a wall panel are not spaced evenly and a window or other fixture may cause an obstruction. So it is contemplated that the wings are removable and can slide into different position to adjust odd size wall panels, including ceilings and corners.

It is also contemplated that the present locking mechanism can accommodate different installation for various objects besides speakers, such as a light switch plate. By adjusting their sizes and shapes, the bracket and the wing can tailored to smaller or larger openings for installation. The locking mechanism allows for easy installation and provide more clearance in locating a stud in the wall panel.

Those skilled in the art will appreciate that the bracket and the wing are installed in different ways. The wing and bracket could, for example, be joined together at a job site. More preferably, however, the wing and bracket are provided as an item of manufacture to the installer. Thus, in various embodiments a kit could contain one or more of a wing, a bracket, a holding clip, a speaker housing, a spackle shield, installation screws, and instructions for installation. The installer would then provide whatever labor is appropriate for the installation, including installing the wing onto the bracket, optionally installing the spackle shield, and optionally mounting the speaker housing to the wall panel.

Thus, specific embodiments and applications of wall mounting bracket installer with attachable wing systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A mounting bracket comprising:
   a body with a peripheral outside edge having at least one entry position with markings;
   a plurality of wings attached to opposing sides of the body whereby the wings are slidable along the outside edge of the body the peripheral direction of via the entry position;

the body has a plurality of attachment positions for attachment of the body to the wing;

the wings having a lip disposed between two mating portions whereby the mating portions each have at least an indentation and a locking clip whereby the mating portions of the wing slide into the attachment positions of the body to ensure locking of the wing to the body.

2. The bracket of claim 1, further comprising a discrete first attachment position from the plurality of attachment positions wherein the wing can be positioned with respect to the body.

3. The bracket of claim 1, wherein the body has at least three sides.

4. The bracket of claim 1, wherein the body has a curved edge.

5. The bracket of claim 2, further comprising a discrete second position from the plurality of attachment positions on a common side of the body with the first attachment position, at which the wing can be alternatively positioned with respect to the body.

6. The bracket of claim 1, wherein the body is selected from the group consisting of: plastic, metal, nonmetal, and mixtures thereof.

7. The bracket of claim 1, wherein the body has a substantially rectangular perimeter and a substantially rectangular opening.

8. The bracket of claim 1, wherein the body has a substantially ovoid perimeter and a substantially ovoid opening.

9. The bracket of claim 1, wherein the body has a perimeter, and defines an opening having a substantially different shape from the perimeter.

10. The bracket of claim 1, wherein the body defines a plurality of openings.

11. The bracket of claim 1, wherein the body has an opening having an area of at least 20 in$^2$.

12. The bracket of claim 1, wherein the body has a perimeter-opening distance of less than 1 inch.

13. The bracket of claim 1, wherein the wing slides onto the body via the entry position and attaches to any attachment position.

14. The bracket of claim 1, further comprising at least one locking position along said outside edge of the body, and said locking clip on said mating portion of the wing mates with the body at the locking position.

15. The bracket of claim 14, wherein the locking clip interlocks with a mating element at the locking position.

16. The bracket of claim 1, wherein said lip slides onto a receiving slot on the body.

17. The bracket of claim 1, wherein the body has an opening, and the wing has a mating portion-opening; wherein the mating portion-opening distance is less than 0.9 in.

18. A commercial product comprising the bracket of claim 1, wherein the wing is pre-attached to the body.

19. A commercial product comprising the bracket of claim 1, wherein the wing is not pre-attached to the body.

* * * * *